United States Patent Office 2,870,182
Patented Jan. 20, 1959

2,870,182
ORGANIC DERIVATIVES OF TETRAVALENT TIN

William E. Leistner, Brooklyn, and Arthur C. Hecker, Richmond Hill, N. Y., assignors to Argus Chemical Laboratory, Inc., a corporation of New York No Drawing. Application May 14, 1952
Serial No. 287,805

3 Claims. (Cl. 260—429.7)

The present invention relates to novel organic derivatives of tetravalent tin and to compositions containing the same. This is a continuation-in-part of Serial No. 270,531, filed February 7, 1952, now Patent No. 2,641,596.

The derivatives according to our invention are derived from tetravalent tin by having at least one valence and at the utmost three valences linked to the sulfur atom of an ester of a mercapto alcohol, while the remaining valence or valences are bound to an alkyl, aryl, oxyalkyl and oxyaryl, and the furfuryl and tetrahydrofurfuryl radical.

The compounds are represented by the type formula $$R_n-Sn-X_{4-n}$$

wherein R stands for a radical selected from the group consisting of alkyl, aryl, oxyalkyl and oxyaryl, and the furfuryl and tetrahydrofurfuryl radicals, X for the radical of an ester of a mercapto alcohol having from 2 to 4 carbon atoms, and $n$ for an integral number from 1 to 3.

Examples for R are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_8H_{17}O$, $C_6H_5O$, $C_6H_4(CH_3)O$; $C_6H_3(CH_3)_2O$; and the furfuryl and tetrahydrofurfuryl groups.

Examples for X are the radicals of esters of mercapto alcohols, such as mercapto ethanol, $HS.CH_2.CH_2.OH$; mercapto butanol, $HS.CH_2.CH_2.CH_2.CH_2OH$; or monothioglycerin, $HS.CH_2.CHOH.CH_2OH$, with aliphatic acids or cycloaliphatic acids containing from 6 to 20 carbon atoms. Taking as specific examples the mercapto ethanol lauric acid esters, the product may have the following formulas:

(1) $(C_4H_9.Sn(S.CH_2.CH_2.OCOC_{11}H_{23})_3$
(2) $(C_4H_9)_2Sn(S.CH_2.CH_2.OCOC_{11}H_{23})_2$
(3) $(C_4H_9)_3Sn(S.CH_2.CH_2.OCOC_{11}H_{23})$

The novel tin compounds according to our invention are oily liquids of high viscosity, whose composition has in each case been ascertained by analysis.

They are soluble in many organic solvents, for instance in ether, benzene, toluene, chloroform, carbontetrachloride, etc.

A general method to prepare these compounds is first to prepare the desired ester of the mercapto alcohol chosen, and subsequently to react the ester with an organic tin halide, organic tin oxide, or a stannonic acid, containing an organic radical.

The invention will now be illustrated by a number of examples, but it should be understood that these are given by way of illustration and not of limitation and that many variations in the compounds given and the amounts indicated can be made without departing from the spirit of the invention and the scope of the appended claims.

EXAMPLE 1
*The preparation of dibutyl-tin di-mercapto ethanol trimethyl hexanoic acid ester*

$$(C_4H_9)_2Sn-(S.CH_2.CH_2.O.CO.C_8H_{17})_2$$

One mol of mercapto ethanol, one mol trimethylhexanoic acid, 200 cc. benzene, to which 0.3 gram p-toluene sulfonic acid were added, are refluxed and 18 cc. water eliminated by azeotropic distillation.

Subsequently, ½ mol of dibutyl tin oxide are added, refluxing being continued until the theoretical amount of water has distilled off. Slight impurities are filtered off and the benzene is distilled off. The residue is a very viscous liquid of a slightly yellowish color. It is soluble in ether, chloroform, carbontetrachloride, benzene, toluene, xylene, and other organic solvents.

| Analysis | Sn | S |
|---|---|---|
| Calc. values | 17.6 | 9.6 |
| Found values | 17.4 | 9.7 |

EXAMPLE 2
*Preparation of dibutyl tin dimercapto butanol trimethylhexanoic acid ester*

$$(C_4H_9)_2Sn-(S.CH_2.CH_2.CH_2.CH_2O.CO.C_8H_{17})_2$$

The procedure is similar to the one described in Example 1, except that instead of one mol mercapto ethanol one mol of mercapto butanol is reacted with the acid.

The final product is similar in appearance and properties to the mixture obtained according to Example 1.

| Analysis | Sn | S |
|---|---|---|
| Calc. values | 16.3 | 8.9 |
| Found values | 16.0 | 8.75 |

EXAMPLE 3
*Preparation of dibutyl tin dimercapto ethanol lauric acid ester*

$$(C_4H_9)_2Sn-(S.CH_2CH_2O.CO.C_{11}H_{23})_2$$

The procedure is similar to the one described in Example 1, except that instead of one mol trimethylhexanoic acid one mol lauric acid is reacted with the alcohol.

The final product is similar in appearance and properties to the material obtained according to Example 1.

| Analysis | Sn | S |
|---|---|---|
| Calc. values | 15.75 | 8.5 |
| Found values | 15.5 | 8.7 |

EXAMPLE 4
*Preparation of dibutyl tin dimercapto ethanol tetrahydroabietic acid ester*

$$(C_4H_9)_2Sn-(S.CH_2.CH_2.O.CO.C_{19}H_{29})_2$$

1,2 mol of commercial tetrahydroabietic acid, one mol of mercapto ethanol, and 200 cc. benzene, to which 0.3 g. p-toluene sulfonic acid were added, are refluxed until 18 cc. water are eliminated by azeotropic distillation.

To this solution, 0.9 mol of dibutyl tin oxide is added and refluxed for one hour. In this case the amount of water which separates out is about 20% less than the calculated amount. The reaction product is filtered and the benzene stripped off the solution.

The residue is in appearance and properties similar to the material obtained according to Example 1.

EXAMPLE 5

*Preparation of tributyl tin monothioglycerin dilauryl ester*

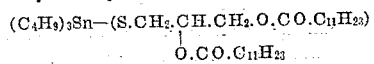

One mol monothioglycerin, two mols lauric acid, and 400 cc. benzene, to which 0.5 g. p-toluene sulfonic acid were added, are refluxed until 36 cc. water have been eliminated by azeotropic distillation.

To this solution, one mol tributyl tin monochloride is added and refluxed for one hour. The reaction product is filtered off and washed with water to eliminate the HCl formed in the reaction. Then the benzene is driven off.

The residue is in appearance and properties similar to the material obtained according to Example 1.

| Analysis | Sn | S |
|---|---|---|
| Values calc | 15.5 | 4.2 |
| Values found | 15.2 | 4.0 |

EXAMPLE 6

*Preparation of isopropyl-tin-trismercapto ethanol trimethylhexanoic acid ester*

$$(C_3H_7)Sn(S.CH_2.CH_2OCOC_8H_{17})_3$$

The procedure is as in Example 1, with the difference that instead of dibutyl tin oxide ⅓ mol isopropyl stannonic acid is reacted with the ester. The isopropyl stannonic acid is prepared as described in the literature. The solution is refluxed until 9 cc. water have been driven off. Benzene is then distilled off.

The residue is in appearance and properties similar to the material obtained according to Example 1.

| Analysis | Sn | S |
|---|---|---|
| Calc. values | 14.5 | 11.8 |
| Found values | 14.3 | 11.9 |

The novel compounds made according to the method described above may be used for various purposes. They are excellent stabilizers for chlorinated and other high molecular weight halogenated material and may be used as antioxidants. They may also be interesting as such, or as intermediates for pharmaceuticals and cosmetics.

In case the compounds are used as stabilizers, the amount by weight of the same will be from 0.1 to 10%.

In the following, an example will be given for the manufacture of a plastic film, in which the compound according to the present invention is used as a stabilizer.

EXAMPLE 7

100 parts of vinylite VYNW (vinyl chloride and acetate copolymer), 50 parts dioctyl phthalate, and 2 parts of the product of Example 1 as stabilizer are mixed by tumbling for a period of one hour. The whole mass is then transferred to a Banbury mixer and fused for 10 min. at a temperature of approximately 300° F. It is then dropped and transferred to a warmup mill, whose roll temperature is likewise maintained at 300° F. The material is then fed as needed to a 3 or 4 roll calender. The roll temperatures of the calender range from 280°–350° F. The vinyl compound is calendered into a film at .004 inch or any other desirable gage.

EXAMPLE 8

A comparison test was made in which chlorinated paraffin was heated over a period of time, without any addition on the one hand, and with addition of a stabilizer made according to the invention on the other hand.

In this test, a nitrogen current was passed through chlorinated paraffin containing 40% chlorine, at a temperature of 150° F. for 12 hours. During the test, the paraffin lost 10% chlorine.

The same chlorinated paraffin, to which 3% of the product obtained in Example 3 were added, was treated in a similar manner and showed a loss of only 1% chlorine after 12 hours.

EXAMPLE 9

The following procedure is used to advantage in making a finished solution of the resin. We use 100 parts of vinylite VYNW (vinyl chloride and acetate copolymer) along with 40 parts of tricresylphosphate. This is weighed into a dry blender; 1 part of stabilizer (made as described in Example 2) is then added. The whole mass is agitated by tumbling for 30 minutes and then transferred to a 2-roll mill whose roll temperatures are about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

What we claim is:

1. As a new compound, a product corresponding to the formula $$R_n—Sn—X_{4-n}$$

wherein R stands for an alkyl radical, X for a radical of an ester of a mercapto alcohol having from 2–4 carbon atoms with an acid selected from the group consisting of a saturated monobasic aliphatic acid containing from 6–20 carbon atoms and tetrahydroabietic acid, and $n$ for an integral number from 1–3, and wherein the sulfur of the mercapto alcohol is connected to the tin.

2. As a new compound, a product corresponding to the formula $$R_n—Sn—X_{4-n}$$

wherein R stands for an alkyl radical, X for a radical of an ester of a mercapto alcohol selected from the group consisting of mercapto ethanol, mercapto butanol, and monothioglycerin with an acid selected from the group consisting of a saturated monobasic aliphatic acid containing from 6–20 carbon atoms and tetrahydroabietic acid, and $n$ for an integral number from 1–3, and wherein the sulfur of the mercapto alcohol is connected to the tin.

3. As a new compound, dibutyl tin dimercaptoethanol lauric acid ester.

References Cited in the file of this patent

UNITED STATES PATENTS

| | | |
|---|---|---|
| 2,479,918 | Fincke | Aug. 23, 1949 |
| 2,560,034 | Eberly | July 10, 1951 |
| 2,592,926 | Mack et al. | Apr. 15, 1952 |
| 2,604,483 | Mack et al. | July 22, 1952 |
| 2,684,650 | Weinberg et al. | Aug. 11, 1953 |

OTHER REFERENCES

Backer et al.: Recueil des Travaux Chimiques, vol. 53 (1934), pp. 1110, 1111, 1112.

Gilman: OSRD. 548, Ser. No. 236, Copy 2. Declassified to open page 12, January 28, 1946.